(12) United States Patent
Schultheis

(10) Patent No.: US 12,084,286 B2
(45) Date of Patent: Sep. 10, 2024

(54) VIBRATORY CONVEYOR FOR BULK MATERIAL

(71) Applicant: Vibra Maschinenfabrik Schultheis GmbH & Co., Offenbach (DE)

(72) Inventor: Winfried Schultheis, Offenbach (DE)

(73) Assignee: Vibra Maschinenfabrik Schultheis GmbH & Co., Offenbach (DE)

( * ) Notice: Subject to any disclaimer, the term of this patent is extended or adjusted under 35 U.S.C. 154(b) by 157 days.

(21) Appl. No.: 17/894,696

(22) Filed: Aug. 24, 2022

(65) Prior Publication Data
US 2023/0064258 A1    Mar. 2, 2023

(30) Foreign Application Priority Data
Aug. 30, 2021  (EP) ..................... 21193891

(51) Int. Cl.
*B65G 27/04*   (2006.01)
(52) U.S. Cl.
CPC ...... *B65G 27/04* (2013.01); *B65G 2812/0384* (2013.01)
(58) Field of Classification Search
None
See application file for complete search history.

(56) References Cited

U.S. PATENT DOCUMENTS

| | | | | |
|---|---|---|---|---|
| 4,844,236 A | * | 7/1989 | Kraus | B65G 27/04 198/771 |
| 5,690,826 A | * | 11/1997 | Cravello | B07B 1/4672 210/384 |
| 5,958,236 A | * | 9/1999 | Bakula | B07B 1/4672 209/403 |
| 6,029,824 A | * | 2/2000 | Adams | B07B 1/48 209/403 |
| 6,216,850 B1 | | 4/2001 | Svejkovksy et al. | |

(Continued)

FOREIGN PATENT DOCUMENTS

| | | |
|---|---|---|
| GB | 372610 A | 5/1932 |
| RU | 2 617 306 C1 | 4/2017 |

OTHER PUBLICATIONS

European Search Report issued for European Patent Application No. 21193891.5, dated Feb. 4, 2022, with a machine generated English translation.

*Primary Examiner* — Kavel Singh
(74) *Attorney, Agent, or Firm* — Myers Wolin, LLC (57) ABSTRACT

A vibratory conveyor for bulk material is provided having a conveying trough or tube for bulk material and a vibration generator connected thereto for generating a directed vibratory excitation to transport the bulk material longitudinally. The directed vibratory excitation has directional components in the longitudinal direction and in a vertical direction opposite gravity. The conveyor further includes at least one retaining weir arranged in the trough or tube for decelerating the bulk material in the longitudinal direction through the trough or tube. The retaining weir has a rear wall in a transport direction of the bulk material and a front wall opposite the transport direction. The rear wall is at least sectionally inclined in an obliquely descending manner from an apex of the retaining weir toward the bottom of the trough or tube. The length of the front wall is smaller than the length of the rear wall.

19 Claims, 7 Drawing Sheets

(56) References Cited

U.S. PATENT DOCUMENTS

| | | | |
|---|---|---|---|
| 6,325,216 B1* | 12/2001 | Seyffert | E21B 21/065 |
| | | | 209/403 |
| 6,607,080 B2* | 8/2003 | Winkler | B07B 1/49 |
| | | | 209/403 |
| 7,108,793 B2* | 9/2006 | Casey | B01D 33/801 |
| | | | 209/396 |
| 8,714,362 B2* | 5/2014 | Jones | B07B 1/469 |
| | | | 209/265 |
| 9,643,111 B2* | 5/2017 | Larson | E21B 21/06 |
| 2010/0018781 A1 | 1/2010 | Schmidhuber | |

* cited by examiner

VIBRATORY CONVEYOR FOR BULK MATERIAL

CROSS REFERENCE TO RELATED APPLICATIONS

This application claims priority under 35 USC § 119 to European Patent Application No. 21193891.5, filed on Aug. 30, 2021, the contents of which are incorporated herein by reference.

FIELD OF THE INVENTION

The invention pertains to a vibratory conveyor for bulk material.

Such a vibratory conveyor may comprise a conveying trough or a conveying tube for accommodating bulk material, at least one vibration generator functionally connected to the conveying trough or the conveying tube and configured for generating a directed vibratory excitation in order to transport the bulk material in longitudinal direction through the conveying trough or the conveying tube, wherein the directed vibratory excitation has directional components in the longitudinal direction of the conveying trough or the conveying tube and in vertical direction opposite to the direction of gravity, and at least one retaining weir in the conveying trough or the conveying tube and configured for decelerating transport movement of the bulk material in longitudinal direction through the conveying trough or the conveying tube.

BACKGROUND

Vibratory conveyors of this type are generally known. The vibratory excitation causes the particles of the bulk material to be transported through the conveying trough or the conveying tube in accordance with the microthrow principle. In this case, the angle of throw is defined by the directed vibratory excitation and results from the vectorial addition of the directional components in the longitudinal direction and in the vertical direction opposite to the direction of gravity. Due to the vibratory excitation, the individual particles of the bulk material are accelerated in accordance with the angle of throw in order to subsequently drop down and be accelerated anew such that particles migrate through the conveying trough or the conveying tube in the longitudinal direction.

The cross section of the conveying trough or the conveying tube typically remains unaffected for mere conveying or metering purposes. In this case, the bulk material normally moves with a conveying speed in the range of approximately 3-20 m/min. The conveying speed depends, among other things, on the product properties, the angle of throw, the operating frequency and the oscillatory width (acceleration).

However, if the bulk material should also be treated or conditioned during its transport through the trough, the dwell time in the conveying trough or the conveying tube is frequently insufficient. For this reason, retaining weirs that reduce the conveying speed of the bulk material in the longitudinal direction are installed into the conveying tube or the conveying trough. The bulk material slowly flows over these retaining weirs. However, the effect of such retaining weirs on the transport of the bulk material, as well as its treatment or conditioning is very difficult to predict. In unfavorable instances, a very inhomogeneous dwell time spectrum of the bulk material particles in the conveying trough or the conveying tube can occur. The risk of lump formation and blockages also increases. Furthermore, compaction areas and dead zones, which dissolve erratically and affect the quality of the bulk material, can form in the delivery flow of the bulk material.

U.S. Pat. No. 6,216,850 B1 discloses a conveyor including a cyclically powered drive mechanism for moving products along an elongate trough in a transport direction and a flow leveller positioned along the floor of the trough for normalizing the flow of product moving in longitudinal direction of the trough. The flow leveller includes a plurality of elongate ramp members laterally spaced between the side walls of the trough. The inclined ramp surface of the leveller is angled up to 25° to 45° while the preferred height of the ramp is said to be 2.5 inches from the floor in a trough having a vertical height of typically 6 inches. However, the problem of insufficient dwell time in the trough persists.

Further conveyors are known from GB 372 610 A, US 2010/018781 A1, RU 2 617 306 C1 and U.S. Pat. No. 4,844,236 A, which teach a sawtooth surface structure on the floor of the trough. However, the height of the teeth is much too small to have a substantial impact on the dwell time of the product for allowing it to be treated or conditioned during its transport through, for which reason this surface structure cannot be regarded as retaining weirs.

SUMMARY

An object of the present invention is finding a remedy or at least achieving improvements with respect to these problems. This disclosure aims to propose solutions that make it possible to realize the most homogeneous dwell time possible for the bulk material and to prevent blockages and lump formation when retaining weirs are used.

This objective may be attained by means of a vibratory conveyor for bulk material with the characteristics described herein. Such vibratory conveyors are characterized by a special geometry of the at least one retaining weir. The retaining weir has a rear wall pointing in the transport direction of the bulk material and a front wall pointing opposite to the transport direction. According to embodiments of the invention, the rear wall of the retaining weir is at least sectionally inclined in an obliquely descending manner from an apex of the retaining weir toward the bottom of the conveying trough or the conveying tube in the longitudinal direction of the conveying trough or the conveying tube.

It has been determined that the length of the front wall measured in the longitudinal direction of the conveying trough or the conveying tube from the runout at bottom side to the apex of the retaining weir can be chosen smaller than the length of the rear wall measured in the longitudinal direction of the conveying trough or the conveying tube from the apex of the retaining weir to the runout at the bottom side.

Surprisingly, compaction effects in the bulk material are thereby largely prevented and the bulk material is at the same time sufficiently transported onward in the transport direction with homogeneous dwell times. In this case, dwell times of up to approximately 30 min can be achieved for the particles of the bulk material. This in turn makes it possible to subject the bulk material in the vibratory conveyor to a treatment or conditioning process, e.g. in the sense of a treatment in a stirrer vessel, for which the dwell time would be much too short in a vibratory conveyor that merely fulfills a conveying or metering function without retaining weirs.

Preferred embodiments of the invention are indicated in further claims.

An oblique inclination of the rear wall can be achieved, for example, in that this rear wall has at least one plane oblique surface section for contacting the bulk material. The rear wall may alternatively or additionally have at least one concavely curved surface section and/or one convexly curved surface section. Vertical surface sections are also possible. Furthermore, the rear wall as a whole may also be realized in the form of an oblique plane or in a convex or concave manner. A scooping/throwing effect, which additionally promotes a reliable transport of the particles of the bulk material with homogeneous dwell times, is thereby achieved in interaction with the directed vibratory excitation.

The rear wall preferably extends over the entire width of the conveying trough or the conveying tube such that all particles in the bulk material are forced to surmount the apex of the retaining weir in the course of their advance through the conveying trough or the conveying tube and the aforementioned scooping/throwing effect is well utilized when the vibratory conveyor is used as intended. A temporary bypass for residual particles may be optionally provided, preferably underneath the rear wall, in order to completely empty the vibratory conveyor, e.g. for cleaning purposes or for a product change.

According to a preferred embodiment of the invention, the ratio of the length of the rear wall measured in the longitudinal direction of the conveying trough or the conveying tube from the apex of the retaining weir up to the runout on the bottom of the conveying trough or the conveying tube to the height of the rear wall measured in the vertical direction of the conveying trough or the conveying tube from the bottom of the conveying trough or the conveying tube up to the apex of the retaining weir preferably lies in the range between 0.5 and 2.0. It has been determined that a particularly homogeneous dwell time spectrum is thereby achieved for the particles in the bulk material.

The length of the rear wall measured in the longitudinal direction of the conveying trough or the conveying tube from the apex of the retaining weir up to the runout on the bottom of the conveying trough or the conveying tube particularly may be smaller than the height of the rear wall measured in the vertical direction of the conveying trough or the conveying tube from the bottom of the conveying trough or the conveying tube up to the apex of the retaining weir.

According to another preferred embodiment of the invention, the front wall of the retaining weir, which is directed opposite to the advance of the bulk material, extends perpendicular to the bottom of the conveying trough or the conveying tube and/or in the direction of gravity. A dead spot underneath the rear wall is thereby prevented. The vertical positioning of the front wall surprisingly has no significant impact on the effect caused by the inclination of the rear wall.

However, the front wall of the retaining weir preferably has at least one surface section for contacting the bulk material, which is angled in the longitudinal direction of the conveying trough or the conveying tube in order to additionally promote surmounting of the retaining weir. This surface section particularly may be angled in an ascending manner from the bottom of the conveying trough or the conveying tube toward the apex of the retaining weir in the longitudinal direction of the conveying trough or the conveying tube.

Such an ascending angulation can be realized, for example, in that the front wall of the retaining weir has at least one concavely curved surface section for contacting the bulk material and/or one or more beads transverse to the longitudinal direction and the vertical direction. An additional reinforcement against the oncoming bulk material can be achieved due to the curvature and/or the beads.

According to another preferred embodiment, vertical and inclined surface sections may be combined with one another on the front wall in such a way that the front wall of the retaining weir has a first surface section for contacting the bulk material, which is located adjacent to the bottom of the conveying trough or the conveying tube and extends perpendicular to the bottom of the conveying trough or the conveying tube and/or in the direction of gravity, as well as a second surface section for contacting the bulk material, which is located adjacent to the first surface section in the direction of the apex of the retaining weir and concavely curved and/or has one or more beads transverse to the longitudinal direction and the vertical direction.

The ratio of the height of the vertical first surface section to the total height of the retaining weir from the bottom up to the apex preferably lies between 0.05 and 0.25.

The number of retaining weirs in the conveying trough or the conveying tube can be chosen in accordance with the respective requirements. This number preferably amounts to three or more. In the best-case scenario, an "ideal stirrer vessel" is formed in the space between the retaining weirs due to their design.

The individual retaining weirs may be separably fastened in the conveying trough or the conveying tube such that the vibratory conveyor can be selectively used for functions with and without retaining weirs. In addition, this makes it possible to increase or decrease the number of retaining weirs as required and to change the distance of the retaining weirs from one another in order to thereby adjust the flow behavior of the bulk material through the conveying trough or the conveying tube.

However, it is also possible to weld the retaining weir or the retaining weirs to the conveying trough or the conveying tube.

According to another preferred embodiment, the front wall and the rear wall of the retaining weir are connected to one another on the apex of the retaining weir.

In order to reinforce the retaining weir, the apex may be optionally formed by an essentially horizontal web that is approximately parallel to a plane defined by the longitudinal direction and the transverse direction of the conveying trough or the conveying tube. The web width preferably lies in the range between 2 and 40 mm.

According to another preferred embodiment, the retaining weir has sidewalls that extend beyond its apex in the vertical direction and have devices for mounting the retaining weir in the conveying trough or the conveying tube. In this way, retaining weirs can be very flexibly positioned in the conveying trough or the conveying tube.

The retaining weir preferably is realized in the form of a sheet metal construction. In this case, the rear wall and the front wall may be realized in the form of formed sheet metal parts. The rear wall and the front wall particularly may be manufactured from a one-piece sheet metal element by means of metal forming.

The above-described vibratory conveyor can be used for angles of throw in the range between 15 and 70°, wherein the angle of throw is the setting angle of the direction of the directed vibratory excitation to the longitudinal direction of the conveying trough or the conveying tube.

The transport of the bulk material through the conveying trough or the conveying tube in the longitudinal direction preferably results from a combination of the vibratory excitation and the fresh supply of bulk material into the conveying trough or the conveying tube. This particularly makes it possible to also realize very steep angles of throw, which in turn promote long dwell times.

The vibratory excitation basically can be coupled into the conveying trough or the conveying tube in any suitable manner. According to a preferred embodiment, the vibration generator comprises at least one electromagnetic vibration drive that is fastened on the conveying trough or the conveying tube or at least two vibration motors for achieving a directed vibrating direction in the form of unbalance motors. The direct connection of the electromagnetic vibration drive or the vibration motors to the conveying trough or the conveying tube on the one hand results in a compact design. On the other hand, no coupling devices to an external drive are required. This is particularly relevant for applications that are subject to strict requirements regarding cleanliness and hygiene.

BRIEF DESCRIPTION OF THE DRAWINGS

The invention is described in greater detail below with reference to exemplary embodiments illustrated in the drawings. In these drawings.

DETAILED DESCRIPTION OF THE PREFERRED EMBODIMENTS

Figure 1:
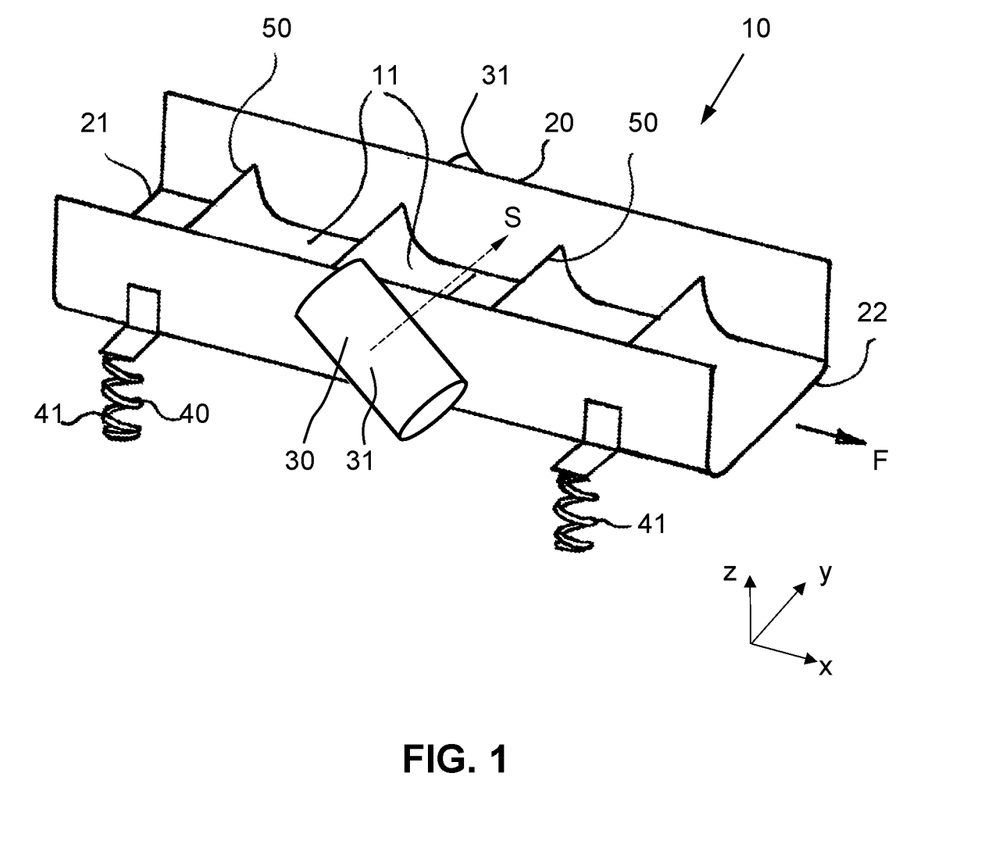
FIG. 1 shows a three-dimensional view of a first exemplary embodiment of a vibratory conveyor according to the invention.

The exemplary embodiment in FIG. 1 shows a vibratory conveyor 10 for bulk material.

The vibratory conveyor 10 comprises a conveying trough 20 for accommodating bulk material and has a trough-shaped cross section. The conveying trough 20 is upwardly open on one longitudinal side. However, it is also possible to use a conveying tube instead of a conveying trough 20.

At least one vibration generator 30 is functionally connected to the conveying trough 2. This vibration generator is configured for generating a directed vibratory excitation S for conveying the bulk material through the conveying trough 20 in the longitudinal direction x.

In the present example, the directed vibratory excitation S has directional components in the longitudinal direction x of the conveying trough 20, as well as in the vertical direction opposite to the direction of gravity z.

As a result, the particles of the bulk material are transported through the conveying trough 20 in the transport direction F in accordance with the initially described micro-throw principle. The individual particles are repeatedly accelerated in the direction S, which extends obliquely upward referred to the longitudinal direction x of the conveying trough 20, after they were introduced into the conveying trough on its supply end 21 and subsequently drop down again. This process is repeated continuously until the particles ultimately reach the delivery end 22 of the conveying trough 20. The angle of throw α between the direction S of the directed vibratory excitation and the longitudinal direction x preferably lies in the range between 15 and 70°. The advance of the bulk material in the conveying trough 20 can be promoted with the fresh supply of bulk material into the conveying trough 20. The transport movement then results from a combination of the vibratory excitation and the fresh supply of bulk material.

In the exemplary embodiment shown, the vibration generator 30 is formed by two vibration motors 31 that are fastened on the conveying trough 20. However, it would also be possible to arrange more than two vibration motors 31 on the conveying trough 20. It is also possible to generate a vibratory excitation by means of an electromagnetic drive. Furthermore, the vibratory excitation may also be generated by means of a separate drive and transmitted to the conveying trough 20 by means of a gearing.

The conveying trough 20 is supported on the ground by means of a spring device 40, e.g. in the form of multiple coil springs 41, in order to allow a corresponding degree of freedom for the vibrating movement. However, the elastic support illustrated in FIG. 1 is merely exemplary and can also be realized differently.

At least one retaining weir 50 is arranged in the conveying trough 20 in order to reduce the conveying speed in the transport direction F. Multiple retaining weirs 50 usually are arranged in the conveying trough 20 behind one another in the transport direction F. It is preferred to provide three or more retaining weirs 50 that decelerate the transport movement of the bulk material through the conveying trough 20 in the longitudinal direction x.

The individual retaining weirs 50 may be separably fastened in the conveying trough 20. In this way, the vibratory conveyor 10 can be selectively used for functions with and without retaining weirs 50. In addition, this makes it possible to change the number of retaining weirs 50 in the vibratory conveyor 10 as required and to change the distance between these retaining weirs. In this way, the vibratory conveyor 10 can be flexibly adapted to the respective requirements. However, it is also possible to weld the retaining weirs 50 to the conveying trough 20.

These retaining weirs 50 have a special design in order to realize the most homogeneous dwell time possible for the bulk material and to prevent blockages and lump formation in the bulk material. This is described in greater detail below with reference to FIGS. 2 to 5.

Figure 2:
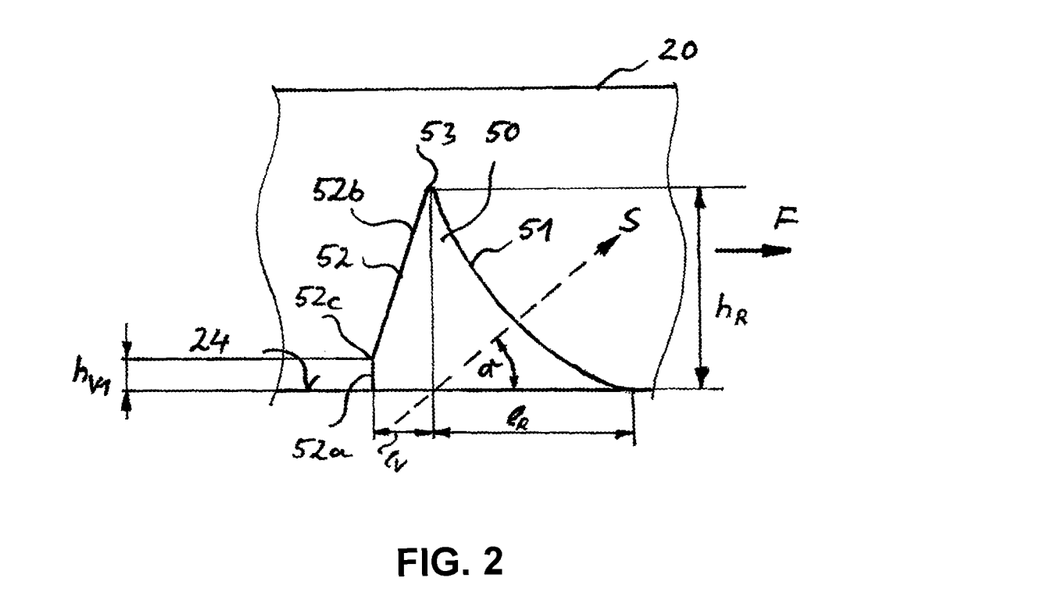
FIG. 2 shows a longitudinal section through a retaining weir of the vibratory conveyor according to FIG. 1.

Each retaining weir 50 has a rear wall 51 that points in the transport direction F of the bulk material and a front wall 52 that points opposite to the transport direction F. The rear wall 51 and the front wall 52 converge at an apex 53 and preferably are connected to one another.

The retaining weir 50 extends upward from the bottom 24 of the conveying trough 20 and preferably occupies the entire width of the conveying trough 20 in its transverse direction y. A bulk material particle therefore has to surmount the apex 53 of all retaining weirs 50 in the conveying trough 20 in order to be transported from the supply end 21 to the delivery end 22.

According to embodiments of the invention, it is proposed that the rear wall 51 of the retaining weir 50 is at least sectionally inclined in an obliquely descending manner from the apex 53 of the retaining weir 50 toward the bottom 24 of the conveying trough 20 in the longitudinal direction x of the conveying trough 20 as illustrated in FIGS. 1 to 5.

In the exemplary embodiment illustrated in FIGS. 1 and 2, the rear wall 51 has at least one concavely curved surface section for contacting the bulk material, which acts upon the bulk material like a scoop during a directed vibratory excitation in the direction S. It has been determined that compaction effects in the bulk material can be largely prevented due to this scooping effect. In addition, the bulk material is sufficiently transported onward in the transport direction F with longer dwell times of up to approximately 30 minutes. All in all, a dwell time spectrum with low variance, which in turn advantageously affects the quality of the bulk material, is thereby achieved for the bulk material particles.

Since the dwell time of the bulk material in the vibratory conveyor 10 is significantly increased in comparison with a mere conveying trough, this vibratory conveyor can be used for decided treatment and conditioning processes of the bulk material. The individual compartments 11, which are separated from one another by the successive retaining weirs 50, can be regarded as successive stirrer vessels.

The rear wall 51 preferably is dimensioned in such a way that the ratio of the length $l_R$ of the rear wall 51 measured in the longitudinal direction x of the conveying trough 20 from the apex 53 of the retaining weir up to the runout on the bottom 24 of the conveying trough 20 to the height $h_R$ of the rear wall 51 measured in the vertical direction z of the conveying trough 20 or the conveying tube from the bottom 24 of the conveying trough 20 up to the apex 53 of the retaining weir 50 lies in the range between 0.5 and 2.0.

The length $l_R$ of the rear wall 51 particularly can be chosen smaller than the height $h_R$ of the rear wall 51.

However, it is also possible to realize embodiments, in which the length $l_R$ of the rear wall 51 is greater than the height $h_R$ of the rear wall 51.

In the exemplary embodiment illustrated in FIGS. 1 and 2, the front wall 52 of the retaining weir 50 is likewise inclined in the longitudinal direction x.

FIG. 2, in particular, shows that the front wall 52 has in the present example a first surface section 52a for contacting the bulk material, which is located adjacent to the bottom 24 of the conveying trough 20 and extends perpendicular to the bottom 24 of the conveying trough 20 and/or in the direction of gravity z. The perpendicular to the bottom 24 and the direction of gravity z may also slightly deviate if the longitudinal direction of the conveying trough 20 is inclined relative to the horizontal.

The front wall 52 in FIG. 2 furthermore has a second surface section 52b for contacting the bulk material, which is located adjacent to the first surface section 52a in the direction of the apex 53 of the retaining weir 50 and in the present example realized in the form of an oblique plane. This angulation promotes surmounting of the retaining weir 50 by the bulk material.

A bead 52c is formed in the region of the connection to the first surface section 52a and increases the rigidity of the front wall 52. This is also advantageous with regard to the mass of the bulk material moving against the retaining weir 50.

The ratio of the height $h_{V_1}$ of the first surface section 52a to the total height h of the retaining weir 50 from the bottom 24 up to the apex 53 preferably lies in the range between 0.05 and 0.25.

Numerous modifications of the retaining weir 50 illustrated in FIG. 2 are possible.

Figure 4:
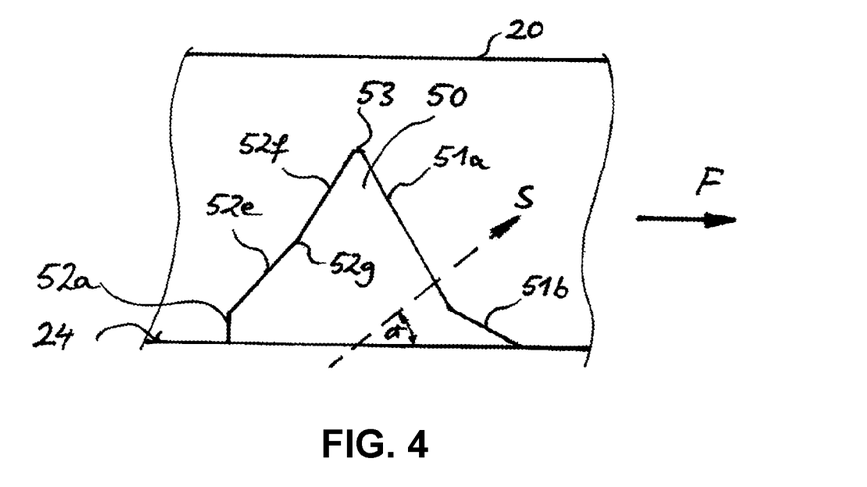
FIG. 4 shows a longitudinal section through a second variation of the retaining weir.

For example, the rear wall 50 may in other design variations have one or more plane surface sections 51a and 51b with optionally different inclination as illustrated in FIG. 4.

Figure 5:
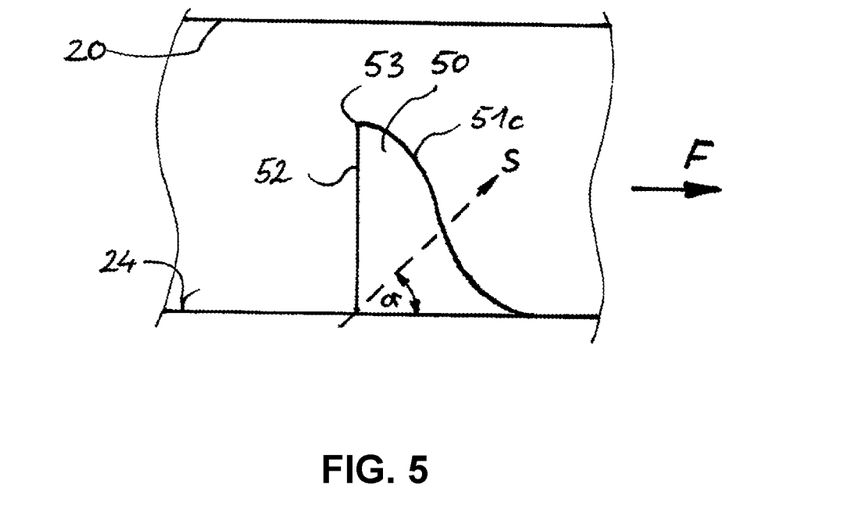
FIG. 5 shows a longitudinal section through a third variation of the retaining weir.

According to FIG. 5, the rear wall 51 may furthermore have a convexly curved surface section 51c for contacting the bulk material, adjacent to which a concave section is located in this mere example.

Figure 6:
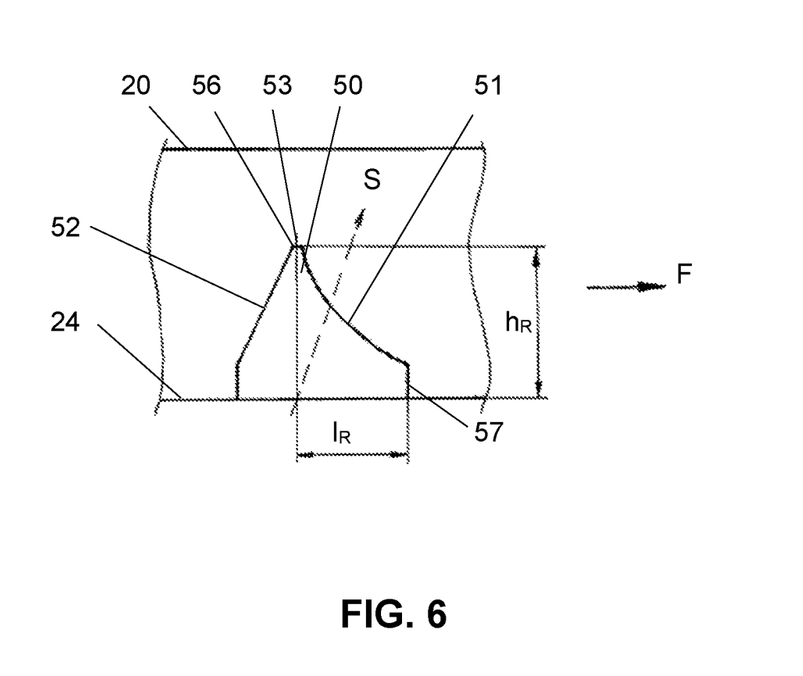
FIG. 6 shows a longitudinal section through a fourth a variation of the retaining weir.

FIG. 6 shows a rear wall 52 that includes a vertical surface section 57, i.e. a surface section without inclination, in combination with a surface section that is inclined in a descending manner, in this example a concave surface section. However, the design of the inclination may also differ from the concave surface section shown as already described above with reference to the other design variations. The vertical surface section is located adjacent to the bottom 24 of the conveying trough 20, but may also be positioned adjacent to the apex 23 or between two inclined sections.

Concave, plain and convex surface sections of different designs can be combined with one another as long as a basically descending inclination of the rear wall 51 in the transport direction F is achieved. Vertical surface sections may also be included. All permutations are hereby considered as disclosed and claimed.

Figure 7:
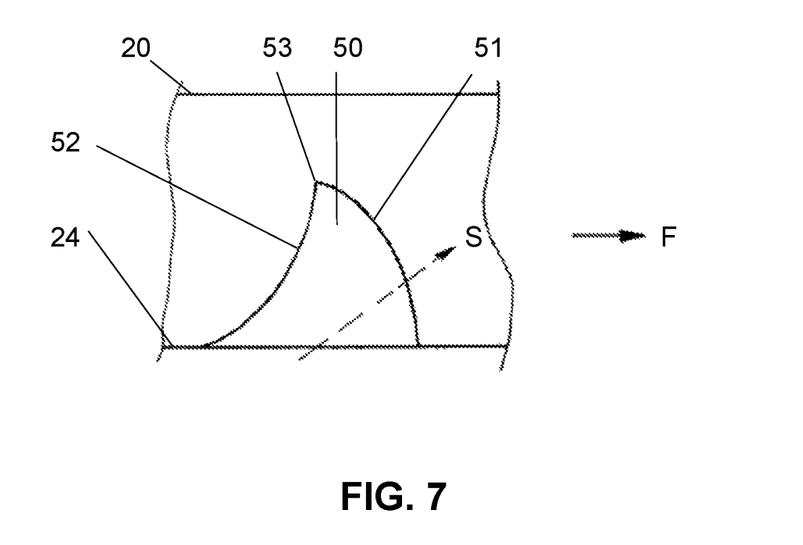
FIG. 7 shows a longitudinal section through a fifth variation of the retaining weir.

According to FIG. 7, this expressly includes the option of a continuously inclined rear wall 51 from the apex 53 to the bottom 24. This is exemplified in the form of a convex design in FIG. 7. However, a continuously concave surface or an oblique plane surface may likewise be used.

The front wall 52 may also be designed differently than shown in FIG. 2.

Figure 3:
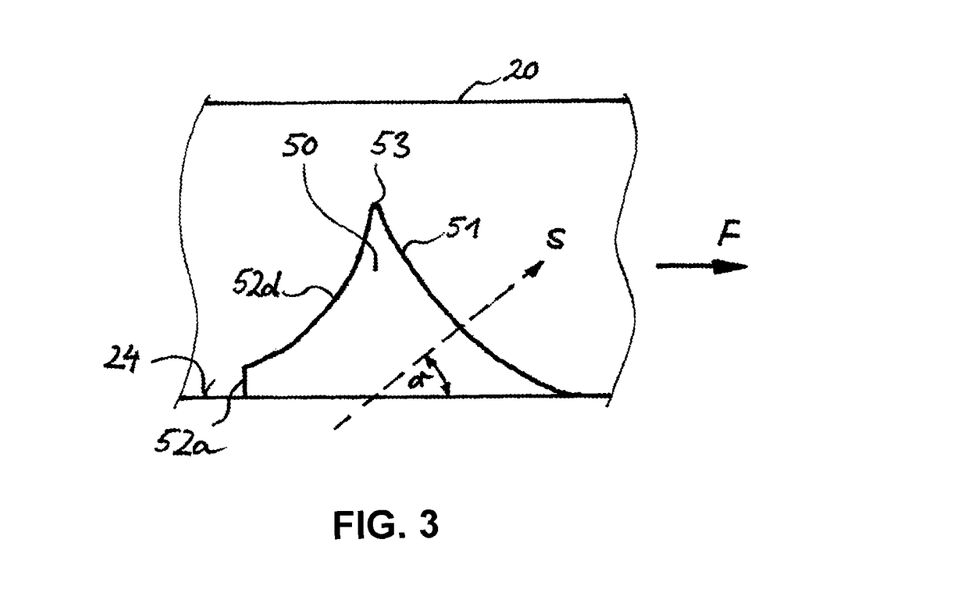
FIG. 3 shows a longitudinal section through a first variation of the retaining weir.

In the first design variation illustrated in FIG. 3, the second surface section 52d is in contrast to FIG. 2 designed in a concave manner.

According to the example illustrated in FIG. 4, it is furthermore possible to replace the plane second surface section 52b in FIG. 2 with two plane surface sections 52e, 52f that have different angles of inclination.

Concave surface sections may in principle also be provided on the front wall 52.

Analogous to the rear wall 51, the front wall 52 may also comprise a combination of different plane, concave and/or convex surface sections. With respect to the front wall 52, this once again also includes the option of a continuously plane, concave and convex design from the apex 53 up to the bottom 24 as illustrated in FIG. 7.

A reinforcement against the oncoming bulk material can be achieved on the front wall 52 by producing beads 52g between differently designed surface sections.

FIG. 5 furthermore shows the option of terminating the retaining weir 50 opposite to the transport direction F with a front wall 52 that extends perpendicular to the bottom 4 of the conveying trough 20 and/or in the direction of gravity z. The aforementioned scooping effect is not affected by this measure.

The presented rear wall and front wall configurations can be arbitrarily combined with one another.

As a rule, the length $l_V$ of the front wall 52 measured in the longitudinal direction x of the conveying trough 20 from the runout on the bottom 24 of the conveying trough 20 up to the apex 53 of the retaining weir 50 can be dimensioned smaller than the length $l_R$ of the rear wall 51 measured in the longitudinal direction x of the conveying trough 20 from the apex 53 of the retaining weir 50 up to the runout on the bottom 24 of the conveying trough 20.

The apex 53 of the retaining weir 50 may be formed by a narrow horizontal web 56 that connects the rear wall 51 and the front wall 52 to one another and additionally reinforces the retaining weir 50. Such a web 56 can be optionally used in all above-described retaining weir geometries. The preceding dimensional indications refer to the center of the web 56.

Figure 8:
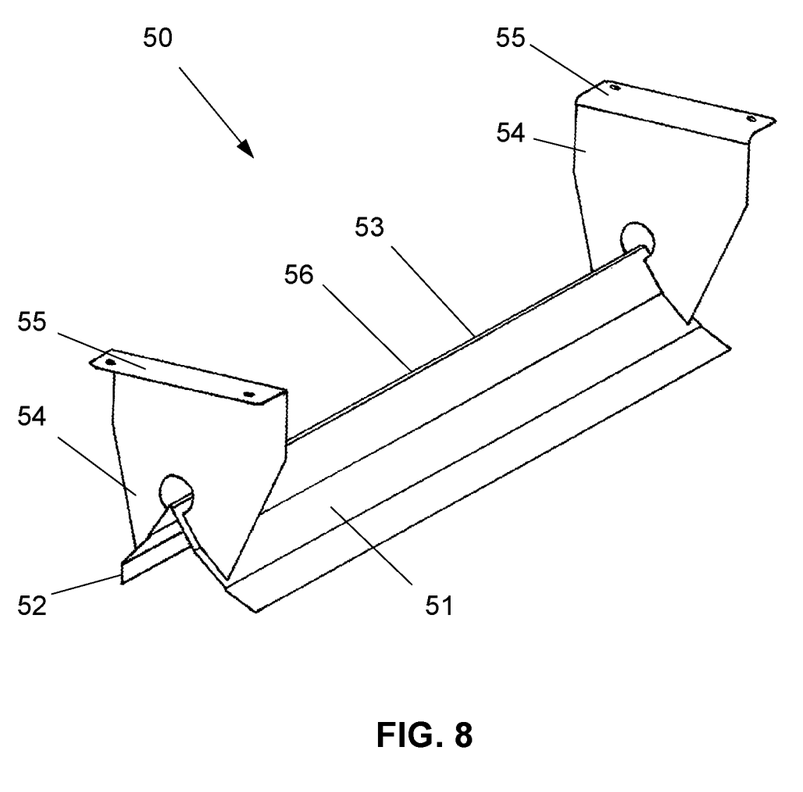
FIG. 8 shows a three-dimensional view of an exemplary embodiment of a mountable retaining weir according to the invention.

FIG. 8 shows an example of a retaining weir 50 that can be mounted in a conveying trough 20. The rear wall 51 and the front wall 52 are realized in the form of formed sheet metal parts and connected to one another in the region of the apex 53. If a horizontal web 56 should be provided, it can be integrally formed on the rear or front wall by means of bending. It is also possible to manufacture the rear wall and the front wall from a single sheet metal element, e.g. by means of bending.

A sidewall 54 is respectively fastened, particularly welded, on the end regions of the retaining weir 50 in the transverse direction y and has devices for mounting the retaining weir in the conveying trough 20. To this end, the upper end sections 55 of the sidewall 54 may be bent outward such that they can be supported on an edge of the conveying trough 20. The fastening on the inner conveyor edge may be realized by means of screws, clamping, welding or otherwise.

Figure 9:
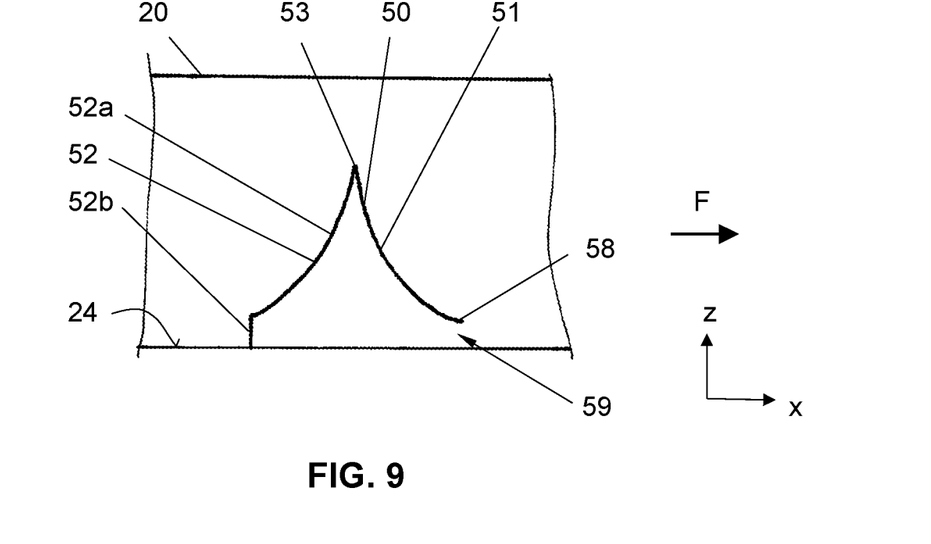
FIG. 9 shows a longitudinal section through a sixth variation of the retaining weir.
Figure 10:
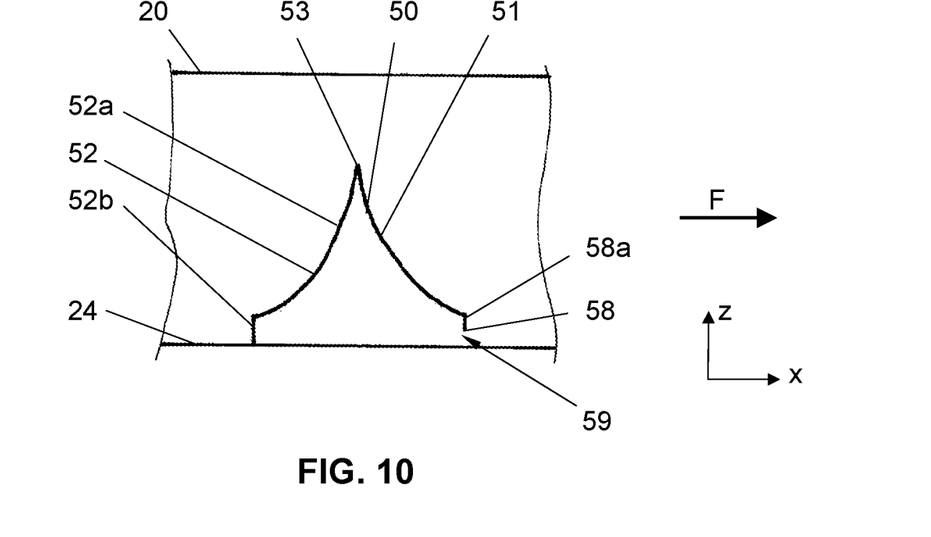
FIG. 10 shows a longitudinal section through a seventh variation of the retaining weir.
Figure 11:
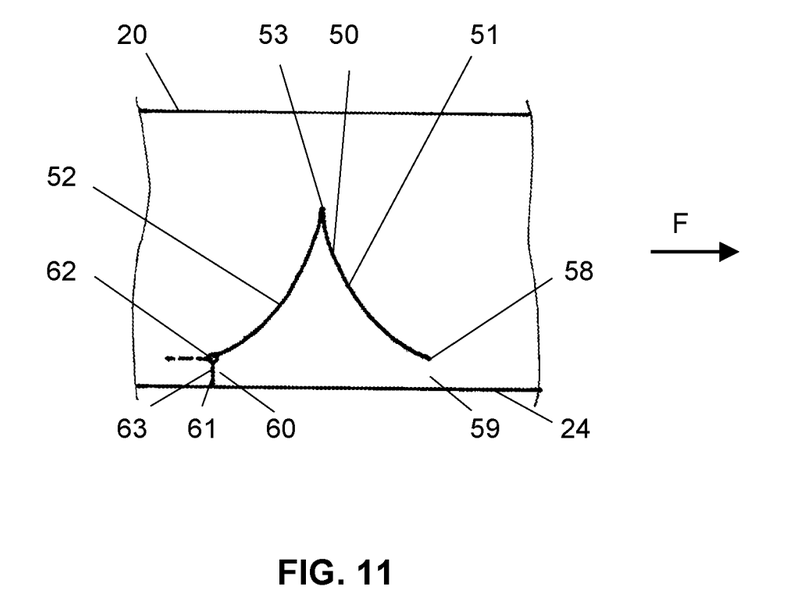
FIG. 11 shows a longitudinal section through an eighth variation of the retaining weir.

FIGS. 9 to 11 show other design variations of the retaining weir 50. In the above-described design variations, the runout of the rear wall 51 at the bottom side is respectively located adjacent to the bottom 24 of the conveying trough 20. In this case, the runout of the rear wall 51 particularly may be adapted to and/or contact the bottom 24. The rear wall 51 particularly may be supported on the bottom 24 of the conveying trough 20 with a terminal edge.

However, this is not the case in the design variations illustrated in FIGS. 9 to 11. Nevertheless, the rear wall 51 is in these examples also at least sectionally inclined in an obliquely descending manner from the apex 53 of the retaining weir 50 toward the bottom 24 of the conveying trough 20 or optionally also a conveying tube in the longitudinal direction of the conveying trough or conveying tube in order to achieve a scooping or throwing effect.

Accordingly, a gap 59 is in the present examples located between a terminal edge 58 of the retaining weir 50 lying in the transport direction F and the bottom 24 of the conveying trough 20. The terminal edge 58 does not contact the bottom 24, but rather is slightly spaced apart from this bottom in the vertical direction z. In this way, mechanical overdeterminations in the support of the retaining weir 50 in the conveying trough 20 or the conveying tube are prevented. The height of the gap 59 preferably is limited to no more than approximately one third of the height h of the retaining weir 50. In other words, the rear wall 51 basically does not have to end on the bottom 24 because the particles of the bulk material on the bottom 24 are transported over the bottom 24 away from the rear wall 51 due to the vibratory excitation anyway such that the gap 59 is not disadvantageous, but rather primarily reduces the mechanical overdetermination of the support.

FIG. 10 shows the option of realizing the terminal edge 58 in the form of the lower edge of an essentially vertical surface section 58a. In this way, a ridge is formed in the region of the terminal edge 58 and causes an additional reinforcement of the rear wall 51. The surface section 58a and the ridge may either be arranged such that they respectively extend vertically in the direction of gravity z and in the transverse direction y, but may optionally also be slightly inclined relative to the direction of gravity z.

In other respects, the progression of the rear wall 51 and of the front wall 52 may be designed in the above-described manner.

According to FIG. 11, a closable opening 60 corresponding to the gap 59 may also be provided on the front wall 52. This opening 60 preferably is arranged in the vicinity of the bottom of the front wall 52. The opening cross section of the opening 60 particularly may be located directly adjacent to the bottom 24 of the conveying trough or the conveying tube. This opening 60 makes it possible to completely empty the conveying trough 20 as needed, e.g. for cleaning purposes or for a product change, in interaction with the gap 59. In this case, bulk material remnants do not have to surmount the apex 53 of the retaining weirs 50, but rather can be transported away along the bottom 24. No additional suction devices are required for completely emptying the conveying trough in this case.

Figure 12:
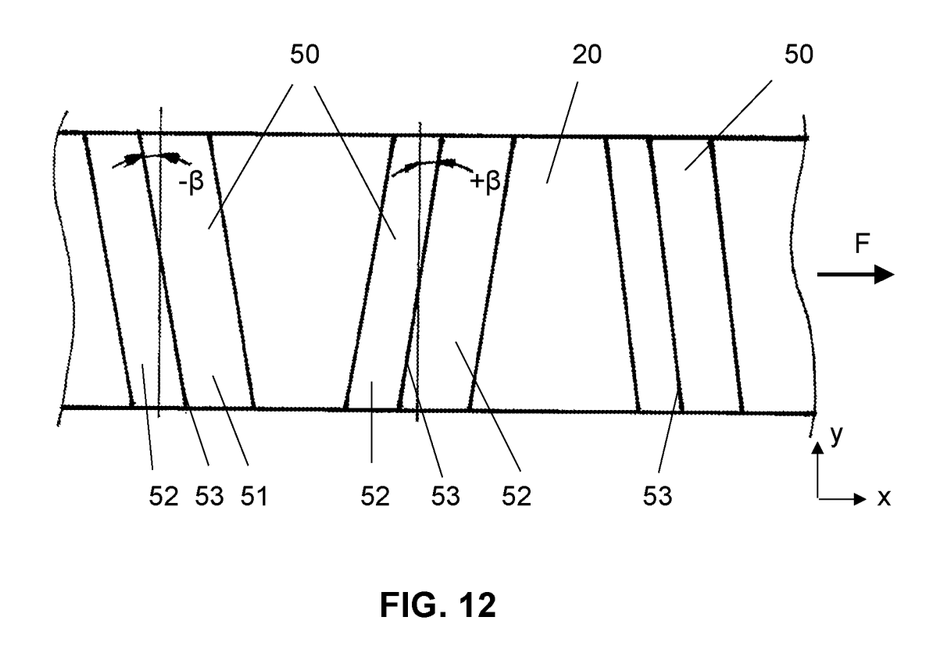
FIG. 12 shows the top view of a vibratory conveyor according to another design variation of the invention.

The closing element 61 may be realized in the form of a simple plate, a slide or, according to the example illustrated in FIG. 12, a flap 63 that is pivotably coupled to the front wall 52 by means of a joint 62 or otherwise. Other means for closing an opening may also be used.

For example, the flap 63 may close the opening 60 in the vertical position and release the opening in an upwardly pivoted position. The flap may be pivoted upward in or opposite to the transport direction F.

In the exemplary embodiment according to FIG. 1, the retaining weirs 50 are arranged such that their apexes 53 extend in the transverse direction y, wherein the apexes 53 lie parallel to one another in FIG. 1. In other variations, it is also possible to arrange the apexes 53 obliquely to the transverse direction y. All retaining weirs 50 may be obliquely positioned in the same direction. However, it is also possible to arrange the retaining weirs 50 in such a way that their apexes 53 extend with positive and negative setting angles β to the transverse direction y alternately or in a different pattern. As a mere example, FIG. 12 shows a top view, i.e. a view in the vertical direction z, of an alternating arrangement of positive and negative setting angles β and −β, but the invention is by no means limited to this variation.

The setting angles β may have the same value. However, it is also possible to operate with setting angles β that have different values. It is preferred to use angles between +/−5° and +/−25°.

An oblique installation of the retaining weirs 50 and, in particular, of retaining weirs 50 with different oblique positioning makes it possible to achieve meandering of the bulk material flow and to thereby influence the dwell time, e.g. in order to realize a longer dwell time.

In the above-described vibratory conveyor 10, the special geometry of the retaining weir 50 makes it possible to prevent or at least significantly reduce compaction effects in the bulk material, which could lead to lump formation or blockages. The vibratory conveyor 10 makes it possible to achieve dwell times of up to approximately 30 min for the bulk material particles, wherein the spectrum of the dwell times remains very narrow over all bulk material particles. This promotes a uniform quality of the particles of the bulk material.

The invention was described in greater detail above with reference to an exemplary embodiment and other variations. The exemplary embodiment and the variations serve for substantiating the feasibility of the invention. Individual technical characteristics described above in the context of other individual characteristics can, as long as technically feasible, also be realized independently of these other individual characteristics and, even if not expressly described, in combination with additional individual characteristics. It is therefore expressly noted that the invention is not limited to the specifically described exemplary embodiment and the variations illustrated in the figures, but rather also includes all designs defined by the patent claims.

What is claimed is:

1. A vibratory conveyor for bulk material, comprising:
a conveying trough or a conveying tube for accommodating bulk material,
at least one vibration generator functionally connected to the conveying trough or the conveying tube and configured for generating a directed vibratory excitation in order to transport the bulk material in a longitudinal direction through the conveying trough or the conveying tube, wherein the directed vibratory excitation has directional components in the longitudinal direction of the conveying trough or the conveying tube and in vertical direction opposite to a direction of gravity, and
at least one retaining weir arranged in the conveying trough or the conveying tube and configured for decelerating transport movement of the bulk material in the longitudinal direction through the conveying trough or the conveying tube,
wherein the retaining weir has a rear wall pointing in a transport direction of the bulk material and a front wall pointing opposite to the transport direction,
wherein the rear wall of the retaining weir is at least sectionally inclined in an obliquely descending manner from an apex of the retaining weir toward the bottom of the conveying trough or the conveying tube in the longitudinal direction of the conveying trough or the conveying tube, said rear wall having at least one of a plane oblique surface section, a convexly curved surface section, and a concavely curved surface section for contacting the bulk material, and
wherein the length of the front wall measured in the longitudinal direction of the conveying trough or the conveying tube from the runout at bottom side to the apex of the retaining weir is smaller than the length of the rear wall measured in the longitudinal direction of the conveying trough or the conveying tube from the apex of the retaining weir to the runout at bottom side.

2. The vibratory conveyor for bulk material of claim 1, wherein the rear wall extends over the entire width of the conveying trough or the conveying tube.

3. The vibratory conveyor for bulk material of claim 1, wherein a ratio of the length of the rear wall to the height of the rear wall measured in the vertical direction of the conveying trough or the conveying tube from the bottom of the conveying trough or the conveying tube up to the apex of the retaining weir lies in the range between 0.5 and 2.0.

4. The vibratory conveyor for bulk material of claim 1, wherein the length of the rear wall is smaller than the height of the rear wall measured in the vertical direction of the conveying trough or the conveying tube from the bottom of the conveying trough or the conveying tube up to the apex of the retaining weir.

5. The vibratory conveyor for bulk material of claim 1, wherein the front wall of the retaining weir has at least one surface section for contacting the bulk material, which is inclined in the longitudinal direction of the conveying trough or the conveying tube, namely inclined in an ascending manner from the bottom of the conveying trough or the conveying tube toward the apex of the retaining weir in the longitudinal direction of the conveying trough or the conveying tube.

6. The vibratory conveyor for bulk material of claim 1, wherein the front wall of the retaining weir has at least one surface section for contacting the bulk material, which is concavely curved and/or has one or more beads transverse to the longitudinal direction and the vertical direction.

7. The vibratory conveyor for bulk material of claim 1, wherein the front wall of the retaining weir extends perpendicular to the bottom of the conveying trough or the conveying tube and/or in the direction of gravity.

8. The vibratory conveyor for bulk material of claim 1, wherein the front wall of the retaining weir has a first surface section for contacting the bulk material, which is located adjacent to the bottom of the conveying trough or the conveying tube and extends perpendicular to the bottom of the conveying trough or the conveying tube and/or in the direction of gravity, and a second surface section (52b, 52d) for contacting the bulk material, which is located adjacent to the first surface section in the direction of the apex of the retaining weir and concavely curved and/or has one or more beads transverse to the longitudinal direction and the vertical direction.

9. The vibratory conveyor for bulk material of claim 1, wherein the ratio of the height of the first surface section to the total height of the retaining weir from the bottom up to the apex lies between 0.05 and 0.25.

10. The vibratory conveyor for bulk material of claim 1, wherein the retaining weir is separably fastened in the conveying trough or the conveying tube.

11. The vibratory conveyor for bulk material of claim 10, wherein the retaining weir has sidewalls that extend beyond its apex and have devices for mounting the retaining weir in the conveying trough or the conveying tube.

12. The vibratory conveyor for bulk material of claim 1, wherein the rear wall and/or the front wall are formed sheet metal parts.

13. The vibratory conveyor for bulk material of claim 1, wherein the front wall and the rear wall of the retaining weir are connected to one another on the apex of the retaining weir by means of an essentially horizontal web.

14. The vibratory conveyor for bulk material of claim 1, wherein one or more of:
the retaining weir is welded to the conveying trough or the conveying tube,
the number of the retaining weirs in the conveying trough or the conveying tube amounts to three or more,
an angle of throw for the bulk material between the direction of the directed vibratory excitation and the longitudinal direction lies in the range between 15 and 70°,
the transport of the bulk material results from a combination of the vibratory excitation and the fresh supply of bulk material into the conveying trough or the conveying tube and/or in that the vibration generator comprises at least two vibration motors that are fastened on the conveying trough or the conveying tube or at least one electromagnetic vibration drive that is fastened on the conveying trough or the conveying tube, and
at least two retaining weirs are provided, wherein the apexes of said retaining weirs have a different setting angle relative to the transverse direction of the conveying trough or the conveying tube.

15. The vibratory conveyor for bulk material of claim 1, wherein a gap is provided between a terminal edge of the rear wall lying in the transport direction and the bottom of the conveying trough or the conveying tube.

16. The vibratory conveyor for bulk material of claim 1, wherein the front wall has in the vicinity of the bottom an opening for emptying the conveying trough or the conveying tube and that a closing element for opening and closing said opening is provided.

17. A vibratory conveyor for bulk material, comprising:
a conveying trough or a conveying tube for accommodating bulk material,
at least one vibration generator functionally connected to the conveying trough or the conveying tube and configured for generating a directed vibratory excitation in order to transport the bulk material in a longitudinal direction through the conveying trough or the conveying tube, wherein the directed vibratory excitation has directional components in the longitudinal direction of the conveying trough or the conveying tube and in vertical direction opposite to a direction of gravity, and
at least one retaining weir arranged in the conveying trough or the conveying tube and configured for decelerating transport movement of the bulk material in the longitudinal direction through the conveying trough or the conveying tube,
wherein the retaining weir has a rear wall pointing in a transport direction of the bulk material and a front wall pointing opposite to the transport direction,
wherein the rear wall of the retaining weir is at least sectionally inclined in an obliquely descending manner from an apex of the retaining weir toward the bottom of the conveying trough or the conveying tube in the longitudinal direction of the conveying trough or the conveying tube,
wherein the length of the front wall measured in the longitudinal direction of the conveying trough or the conveying tube from the runout at bottom side to the apex of the retaining weir is smaller than the length of the rear wall measured in the longitudinal direction of the conveying trough or the conveying tube from the apex of the retaining weir to the runout at bottom side,
wherein the front wall of the retaining weir has a first surface section for contacting the bulk material, which is located adjacent to the bottom of the conveying trough or the conveying tube and extends perpendicular to the bottom of the conveying trough or the conveying tube and/or in the direction of gravity, and a second surface section for contacting the bulk material, which is inclined or curved and connects the first surface section to the apex of the retaining weir, and
wherein an angle of throw for the bulk material between the direction of the directed vibratory excitation and the longitudinal direction lies in the range between 15 and 70°,
wherein the ratio of the height of the first surface section to the total height of the retaining weir from the bottom up to the apex lies between 0.05 and 0.25.

18. The vibratory conveyor for bulk material of claim 17, wherein a gap is provided between a terminal edge of the rear wall lying in the transport direction and the bottom of the conveying trough or the conveying tube.

19. A vibratory conveyor for bulk material, comprising
a conveying trough or a conveying tube for accommodating bulk material,
at least one vibration generator functionally connected to the conveying trough or the conveying tube and configured for generating a directed vibratory excitation in order to transport the bulk material in a longitudinal direction through the conveying trough or the conveying tube, wherein the directed vibratory excitation has directional components in the longitudinal direction of the conveying trough or the conveying tube and in vertical direction opposite to a direction of gravity, and
at least one retaining weir arranged in the conveying trough or the conveying tube and configured for decelerating transport movement of the bulk material in a longitudinal direction through the conveying trough or the conveying tube,
wherein the retaining weir has a rear wall pointing in a transport direction of the bulk material and a front wall pointing opposite to the transport direction,
wherein the rear wall of the retaining weir is at least sectionally inclined in an obliquely descending manner from an apex of the retaining weir toward the bottom of the conveying trough or the conveying tube in the longitudinal direction of the conveying trough or the conveying tube,
wherein the length of the front wall measured in the longitudinal direction of the conveying trough or the conveying tube from the runout at bottom side to the apex of the retaining weir is smaller than the length of the rear wall measured in the longitudinal direction of the conveying trough or the conveying tube from the apex of the retaining weir to the runout at bottom side,
wherein a ratio of the length of the rear wall to the height of the rear wall measured in the vertical direction of the conveying trough or the conveying tube from the bottom of the conveying trough or the conveying tube up to the apex of the retaining weir lies in the range between 0.5 and 2.0,
wherein the rear wall extends over the entire width of the conveying trough or the conveying tube, and
wherein the rear wall is a formed sheet metal part.

* * * * *